June 12, 1951   J. R. LONG ET AL   2,556,502
THERMALLY-ACTUATED CIRCUIT CONTROL DEVICE
Filed March 14, 1947
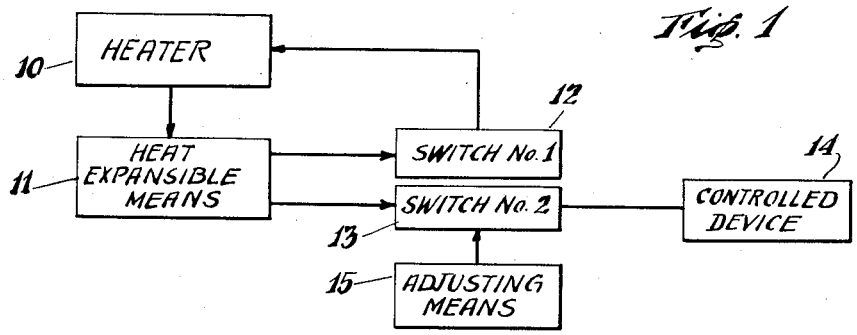
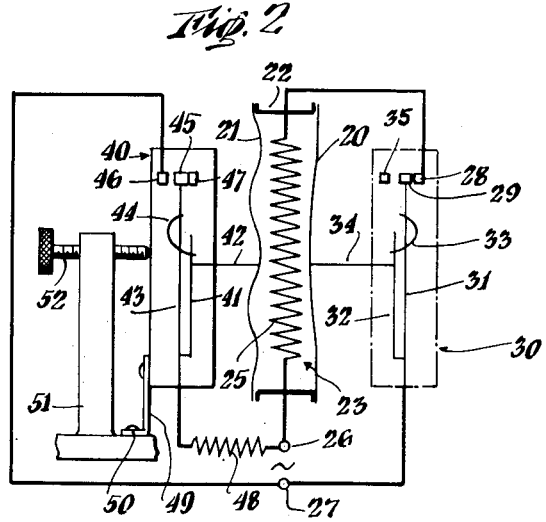
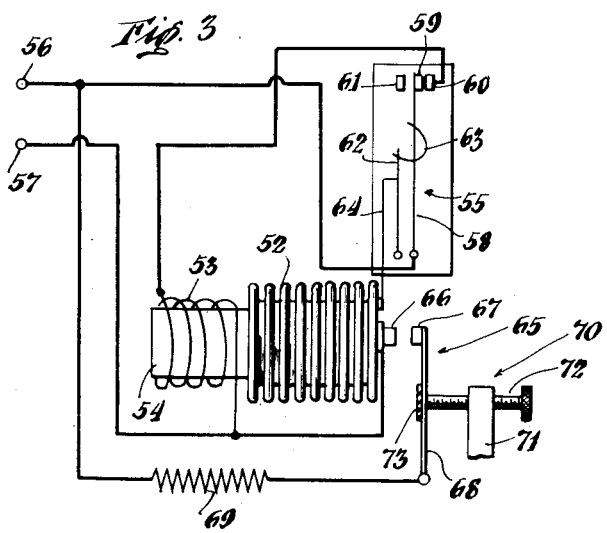
INVENTORS
John Robert Long
BY Emerson L. Stroh
Nicholas Lange
ATTORNEY Patented June 12, 1951

2,556,502

UNITED STATES PATENT OFFICE 2,556,502

THERMALLY-ACTUATED CIRCUIT CONTROL DEVICE

John R. Long and Emerson L. Stroh, Indianapolis, Ind., assignors to P. R. Mallory & Co., Inc., Indianapolis, Ind., a corporation of Delaware Application March 14, 1947, Serial No. 734,588

3 Claims. (Cl. 200—122)

This invention relates to control devices and, more particularly, to control devices embodying a cyclically actuated thermoresponsive element for periodically energizing a controlled device together with adjusting means for varying the proportion of each cycle during which such controlled device is energized.

The control devices of this invention are particularly adapted for use with electrical loads, such as range surface elements, to permit the heat developed to be evenly and continuously varied from 0% to 100% of the maximum output thereof.

Broadly speaking, our novel control devices comprise a self-cycling device including a heat expansible member which is periodically expanded and contracted at a rate practically independent of the ambient temperature or changes in the setting of the control. The cyclic movement of this member operates a switch device which, in turn, actuates the device to be controlled in a periodic manner. An adjusting device cooperates with the switch to vary the proportion of each cycle during which the controlled device is energized thereby varying the average or effective energization of the controlled device over a plurality of operating cycles. In this manner, we provide a control device which is practically free from the effects of ambient temperature variations and which permits smooth and accurate adjustment of the controlled device throughout its operating range. Economy of operation is also obtained in that the controlled device is not continuously operated when less than the full output thereof is desired; instead, it is operated only for the proportion of each cycle which is necessary to provide the desired output.

It is, therefore, an object of this invention to improve the construction and operation of control devices.

It is a further object of the invention to provide a control device embodying the combination of a thermoresponsive self-cycling device with adjusting means for varying the proportion of each cycle during which a controlled device is energized.

It is a still further object of the invention to provide a control device which is particularly adapted for the control of electrical loads, such as range surface elements.

The invention also contemplates a control device which is simple and reliable in operation, of low cost, and of durable construction.

It is further within the scope of the invention to provide a control device which is substantially free from the effects of ambient temperature variations and which insures economical operation of the device controlled thereby.

Other objects of the invention will be apparent from the following description and accompanying drawings taken in connection with the appended claims.

The invention accordingly comprises the features of construction, combination of elements, arrangement of parts, and methods of manufacture referred to above or which will be brought out and exemplified in the disclosure hereinafter set forth, including the illustrations in the drawings, the scope of the invention being indicated in the appended claims.

For a fuller understanding of the nature and objects of the invention as well as for specific fulfillment thereof, reference should be had to the following detailed description taken in connection with the accompanying drawings, in which:

Figure 1 is a block diagram illustrating the broad concept of this invention;

Figure 2 is a diagram showing a specific control device constructed in accordance with the principles of Figure 1 and embodying a sealed diaphragm chamber;

Figure 3 is a diagrammatic view of a modified control device embodying the broad concept of Figure 1 and utilizing a sealed bellows chamber.

While a preferred embodiment of the invention is described herein, it is contemplated that considerable variation may be made in the method of procedure and the construction of parts without departing from the spirit of the invention. In the following description and in the claims, parts will be identified by specific names for convenience, but they are intended to be as generic in their application to similar parts as the art will permit.

Referring now to the drawing in detail, the broad concept of this invention is illustrated in the block diagram of Figure 1. In accordance with the invention, a thermoresponsive self-cycling device is provided including a heater 10 in heat transfer relation with heat expansible means 11. A first switch device 12 is actuated by the heat expansible means 11, this switch, in turn, controlling the energization of the heater 10. The control 12 is so adjusted as to energize the heater when the temperature of the expansible means reaches a lower limit and deenergize the heater when the temperature of the expansible means reaches an upper limit. Accordingly, the heat expansible means 11 cyclically expands and contracts between the positions thereof defined by the aforesaid temperature limits. Both of these temperature limits are sufficiently high as to be unaffected by changes in ambient temperature so that the position of the expansible means at these temperaure limits is likewise unaffected by varia tions in ambient temperature.

The heat expansible means 11 operates a second switch 13 which, in turn, actuates a controlled device 14 and, as the expansible means is cyclically expanded and contracted by the heater 10, the controlled device is alternately energized and deenergized by the switch 13.

Generally speaking, the controlled device is energized during a portion of each operating cycle and deenergized throughout the remainder of each cycle. However, when full power is to be delivered by the controlled device, it may be energized continuously throughout the whole of each cycle or, when no power is to be delivered, the controlled device may be deenergized throughout the entire cycle.

In order to vary the average time of energization of the controlled device, adjusting means 15 are provided which interact with the switch 13, the adjusting means being adapted to change the portion of each cycle during which the controlled device is energized, thereby to vary the average or effective energization of the controlled device over a plurality of operating cycles. Thus, if the means 15 is adjusted so that the controlled device is energized for 25% of each operating cycle, the controlled device will deliver 25% of its maximum output. Similarly, if the means 15 is adjusted so that the controlled device is energized for 75% of each operating cycle, it will deliver 75% of its maximum output over a plurality of operating cycles.

The application of the broad principles set forth in Figure 1 to specific control devices is illustrated by Figures 2 and 3. Referring to Figure 2, heat expansible means are provided including a snap action diaphragm 20 and a breather diaphragm 21 which, together with a cylindrical casing 22, define a sealed chamber 23 filled with a suitable heat expansible fluid, such as air. It will be understood that the diaphragm 20 snaps outwardly when the temperature of the chamber reaches an upper limit and that this diaphragm moves inwardly with an abrupt snap action when the temperautre of the chamber falls to a predetermined lower limit; in contrast, the breather diaphragm 21 moves inwardly and outwardly in a uniform manner responsive to changes in the temperature of the chamber.

A heater 25 is disposed within the chamber 23 to expand the fluid therein and cause expansion of the diaphragms 20 and 21. Although the heater is shown within the chamber, it will be understood that an external heater may be utilized provided that it is in heat transfer relation with the fluid inside the chamber. The heater 25 is connected in circuit with the terminals 26, 27 of a suitable current source and the contacts 28, 29 of a snap action switch device 30.

The switch 30 comprises an actuated member 31 carrying the movable contact 29 and an actuating member 32 which is connected with the actuated member by a U-shaped snap action spring 33. The actuating member 32 has an actuator 34 connected thereto which is movable by the snap action diaphragm 20. When the contacts 28, 29 are closed, as shown, the diaphragm 20 is in its collapsed position and the heater 25 is energized. The energization of the heater causes the fluid within the chamber to expand and, when an upper temperature limit is reached, the diaphragm 20 snaps outwardly thereby operating the switch 30, the movable contact 29 being disengaged from contact 28 and moving into engagement with a fixed stop 35. Responsive to the opening of contacts 28 and 29, the heater is deenergized and the fluid within the chamber cools until a lower temperature limit is reached at which the diaphragm moves inwardly by snap action thus closing contacts 28, 29 to start a new cycle of operation. As a result, the heater 25 is periodically energized and deenergized causing the cyclic expansion and contraction of the diaphragms 20 and 21.

It will be apparent that we have provided a self-cycling device in accordance with the broad concept of Figure 1, the heater 25 corresponding to the heater 10 of Figure 1, the diaphragm chamber corresponding to the heat expansible means 11 of Figure 1, and the switch 30 corresponding to the switch 12 of Figure 1. Assuming that the upper and lower temperature limits at which the diaphragm 20 snaps inwardly and outwardly are both well above ambient temperature, it will be apparent that the position of the diaphragms at these temperature limits is substantially uneffected by changes in ambient temperatures.

In accordance with the invention, the expansion and contraction of the diaphragm or heat expansible member 21 actuates a second switch 40 which corresponds to the switch 13 of Figure 1. The switch 40 comprises an actuating member 41 which is connected to the breather diaphragm 21 by an actuator 42 and to an actuated member 43 by a U-shaped snap action spring 44. The actuated member carries a movable contact 45 which is engageable with a fixed contact 46 and a stop 47. It will be apparent that the contacts 45, 46 of the switch 40 are cyclically opened and closed by the periodic expansion and contraction of the breather diaphragm 21 resulting from the cyclic energization of the heater 25. The contacts 45, 46 are connected in circuit with the power source 26, 27 and a load or controlled device 48 so that the load is energized during a portion of each operating cycle. It will be understood that the load 48, which corresponds to the controlled device 14 of Figure 1, may be a resistive heating element, such as a range surface element. Alternatively, the load 48 may represent a device such as relay, lamp, motor or other electrical appliance and the term controlled device in the specification and appended claims is intended to broadly comprehend all such appliances and loads.

An adjusting means corresponding to the means 15 of Figure 1 is provided for varying the proportion of each cycle during which the controlled device is energized thereby to vary the average output of the controlled device. To this end, the switch 40 is mounted on a spring member 49 which is pivoted at 50 to a bracket or base 51. This bracket carries an adjusting screw 52 which is adapted to move the casing of switch 40 relative to the actuator 42. It will be apparent that adjustment of the screw 52 will change the point in the operating cycle at which the switch is actuated thereby varying the proportion of each cycle during which the controlled device is energized. Broadly speaking, the function of the adjusting screw 52 is to effect relative movement between the actuator 42 and one of the switch contacts (contact 46 in the example shown) independently of the cyclic movement of the diaphragm thereby changing the length of the closed contact period during each cycle.

Another embodiment of the broad inventive concept of Figure 1 is disclosed in Figure 3 wherein a self-cycling device is provided including a bellows 52 which is expanded and contracted in response to periodic energization of a heater coil 53. This coil is positioned upon the outside of a cylindrical member 54 defining a sealed chamber communicating with the bellows, this chamber being filled with a suitable heat expansible fluid, such as air. The heater 53 is connected in circuit with a switch 55 and the terminals 56, 57 of a suitable power source.

The switch 55 comprises an actuated member 58 carrying a movable contact 59 which is co-actable with a fixed contact 60 and a stop 61. The switch is operated by an actuating member 62 connected to the actuated member by a U-shaped snap action spring 63 and the actuating member is operated by an arm 64 attached to the bellows 52. In this manner, a self-cycling device is provided embodying the broad inventive concept of Figure 1, the bellows chamber 52, 54 corresponding to the heat expansible means 11 of Figure 1, the coil 53 corresponding to the heater 10 of Figure 1, and the switch 55 corresponding to the switch 12 of Figure 1.

In the position shown, the contacts 59 and 60 are closed with the result that the heater coil 53 is energized thereby to cause expansion of the bellows 52. When an upper temperature limit is reached, the bellows 52 is expanded sufficiently to actuate switch 55 and open the contacts 59, 60 thereby deenergizing the heater and allowing the fluid within the bellows to cool. Responsive to the resulting contraction of the bellows, the switch 55 is again closed when a lower temperature limit is reached thereby energizing the heater to start a new cycle of operation.

In accordance with the invention, the expansible means or bellows 52 operates a second switch device 65 corresponding to the switch 13 of Figure 1. This switch comprises a movable contact 66 which is engageable with a fixed contact 67 mounted on a resilient spring arm 68. The contacts 66 and 67 are connected in circuit with a load or controlled device 69 and the terminals 56, 57 of a suitable current source. It will be apparent that these contacts are closed during a part of each cycle in response to the periodic expansion and contraction of the bellows and, as a result, the load or controlled device 69 is energized during a portion of each operating cycle. An adjusting device 70 corresponding to the means 15 of Figure 1 is provided to vary the portion of each cycle during which the controlled device is energized thereby to vary the average output of the controlled device. This adjusting device comprises a standard or bracket 71, carrying a threaded adjusting screw 72 and this screw carries a stop 73 at the free end thereof which is engageable with the contact arm 68. This spring arm is biased into engagement with the stop 73 so that adjustment of the screw 72 effects relative movement between the actuator 68 and the contact 66 independently of the cyclic movement of the bellows. As the bellows expands during each cycle, the contact 66 moves into engagement with the contact 67 and thereafter the contacts move together in response to further expansion of the bellows, the arm moving away from the stop 73 during this period. When the switch 55 is opened and the bellows begins to contract, the contacts remain in engagement until the arm 68 again engages the stop 73. Thereupon, the contacts are opened and the contact 66 moves inwardly away from contact 67 in response to further contraction of the bellows. It will be apparent, therefore, that the contacts 66, 67 are closed during a portion of each operating cycle and that adjustment of the screw 73 changes the length of the closed contact period thereby varying the average energization of the load throughout a plurality of operating cycles.

It will be apparent from the foregoing description that the practice of the invention broadly defined in Figure 1 may be carried out by the use of a large number of equivalent structures. Thus, the heat expansible means 11 may, for the purposes of the present invention, consist of a sealed diaphragm chamber, a bellows chamber, a bi-metal strip or any other means which expands and contracts in response to alternate heating and cooling. The heater 10 may consist of a coil or wire of resistance metal disposed inside or outside the expansible means or the heater may comprise any controllable heating element for causing expansion and contraction of the expansible means which is in heat transfer relation therewith. The switch devices actuated by the heat expansible means may be of the snap action type, or the ordinary nonsnap action type.

Although it is preferred that the heater 10, heat expansible means 11, and switch 12 shall cooperate to provide a self cycling device, it may be desirable, in some instances, to control the switch 12 independently of the heat expansible means 11 and such independent control is considered to be comprehended within the broader aspects of this invention.

The adjusting means may be broadly considered as a device for effecting relative movement between the actuator of the switch 13 and one of the contacts of said switch. Thus, in Figure 2, the adjusting means effects relative movement between contact 46 and the actuator 42. It will be apparent that the adjusting device might move contact 46 directly instead of moving the switch bodily about the pivot 50.

It will be understood that the controlled device 14 of Figure 1 preferably represents a heater element, such as a range surface element. However, it is also within the scope of the invention to control any type of electrical load, such as a motor, relay, lamp, or any other type of controlled device.

What is claimed as new and desired to be secured by Letters Patent is:

1. In a control device for varying the effective current supplied to a load, an expansible chamber member having two different moving elements, a resistive heating element adapted, when periodically energized, to cause expansion and contraction of said member, a circuit independent of said load including said heating element and a set of contacts actuated by one of the moving elements of said member, said circuit effecting cyclic expansion and contraction of said expansible chamber member through periodic energization of said heating element, a second set of contacts controlled by said other moving element of said expansible chamber member whereby said latter contacts may be closed during a portion of each cycle, and means for varying the spacing of said latter set of contacts thereby to vary the percentage of each cycle during which the contacts are closed.

2. An electrically operated thermo-control device for controlling the effective electrical energy supplied to a load, said device comprising an expansible chamber element having two different moving members, an electric heating element for said expansible chamber element, a control circuit for said heating element having a pair of contacts controlled by one of the moving members of the expansible chamber element to connect said heating element to an electric energy supply when the temperature of said expansible chamber element falls to a predetermined value and to disconnect said element when the temperature of said expansible chamber element rises to a predetermined higher value, and a second pair of contacts controlled by the other of said moving members being opened and closed by said expansible chamber element when the temperature of said latter element is between said predetermined values.

3. An electrically operated thermo-control device for controlling the effective electrical energy supplied to a load, said device comprising a thermoresponsive expansible chamber element having two different moving members the positions of which depend upon temperature, an electric heater for said expansible chamber element to activate the same, an electric switch having a first pair of contacts controlled by one of the moving members of said expansible chamber element so as to close said heater circuit periodically when the temperature of said expansible chamber element falls to a predetermined value and to periodically open said heater circuit when the temperature of said expansible chamber element rises to a predetermined higher value, and a second pair of electric contacts connected to the other of said moving members of said expansible chamber element while said element travels between two extreme temperature positions thereof, and means for adjusting the position at which said latter contacts are operated by the movement of said latter moving member of said expansible chamber element.

JOHN R. LONG.
EMERSON L. STROH.

REFERENCES CITED

The following references are of record in the file of this patent:

UNITED STATES PATENTS

| Number | Name | Date |
|---|---|---|
| 1,205,434 | Connell | Nov. 21, 1916 |
| 1,689,809 | Vaughan | Oct. 30, 1928 |
| 1,718,748 | Marshall | June 25, 1929 |
| 2,044,147 | Bletz | June 16, 1936 |
| 2,195,947 | Uhlrig | Apr. 2, 1940 |
| 2,269,111 | Jepson et al. | Jan. 6, 1942 |
| 2,275,917 | Newell | Mar. 10, 1942 |
| 2,346,841 | Henderson | Apr. 18, 1944 |
| 2,385,606 | Campbell | Sept. 25, 1945 |
| 2,421,953 | MacKendrick | June 10, 1947 |